E. STOCK.
NUT LOCK.
APPLICATION FILED JUNE 8, 1914.

1,129,753.

Patented Feb. 23, 1915.

Witnesses

Inventor
E. Stock
By
Attorney

UNITED STATES PATENT OFFICE.

EPHRAIM STOCK, OF HAMSFORK, WYOMING.

NUT-LOCK.

1,129,753.	Specification of Letters Patent.	Patented Feb. 23, 1915.

Application filed June 8, 1914. Serial No. 843,846.

*To all whom it may concern:*

Be it known that I, EPHRAIM STOCK, a citizen of the United States, residing at Hamsfork, in the county of Lincoln and State of Wyoming, have invented certain new and useful Improvements in Nut-Locks, of which the following is a specification.

The object of this invention is the provision of a simple and efficient device for locking a nut against rotation on a bolt and including a spring slidable in the nut and having engagement with the bolt and a bow spring engaging the outer end of the slidable spring for retaining the latter against the bolt.

Figure 1:
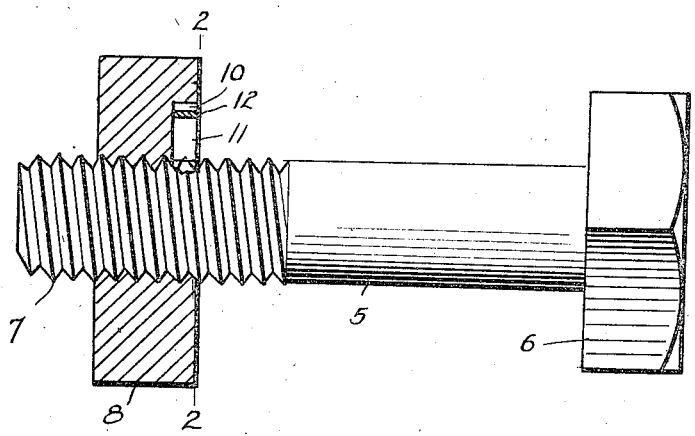
Figure 2:
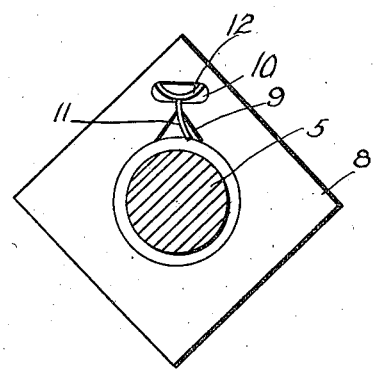

With this and other objects in view, the invention consists in the novel construction, arrangement and combination of parts as will be hereinafter specifically described, claimed and illustrated in the accompanying drawings, in which, Figure 1 represents a side elevation of a bolt and a nut, in section, positioned thereon, and, Fig. 2 represents a transverse sectional view on the line 2—2 of Fig. 1.

Referring to the drawing in detail, wherein similar reference numerals designate corresponding parts throughout the several views, the numeral 5 indicates a bolt of the ordinary or any preferred construction, carrying a head 6 at one end and screw threads 7 at the opposite end. A polygonal nut 8 is fitted to screw upon the bolt 5 and is formed in one face with a V-shaped recess 9, the walls of which converge outwardly of the bolt receiving opening through the nut. The recess 9 is preferably directed toward one corner of the nut 8 and communicates with a second recess 10 formed intermediate the threaded bore of the nut and the corner. The walls of the narrow passage or channel communicating the recesses 9 and 10 are parallel and the outer end of a locking spring 11 is slidably mounted therein. The spring 11 projects a short distance into the outer recess 10 and projects inwardly through the recess 9 a short distance inwardly of the wall of the threaded bore of the nut whereby when the bolt 5 is positioned in the nut 8 the spring 11 is moved laterally toward one of the converging walls of the recess 9, as illustrated in Fig. 2. A bow spring 12 is positioned within the recess 10 and is secured against removal by the frictional engagement of the ends thereof against the walls of said recess. The outer end of the locking spring 11 is engaged against the medial portion of the convex face of the spring 12 which latter assists in retaining the inner end of the locking spring 11 in positive engagement with the threads 7 of the bolt to prevent the nut from unscrewing.

What I claim is:—

A nut lock comprising a bolt, a nut receiving said bolt and having an outwardly converged V-shaped recess in one face thereof communicating with a second recess in the same face, a spring locking member slidably mounted in said V-shaped recess, projecting a short distance into said second mentioned recess and having frictional engagement with the threads of said bolt, and a bow spring seated in said second mentioned recess and engaged at its convex face against the outer end of said first mentioned spring.

In testimony whereof I affix my signature, in presence of two witnesses.

EPHRAIM STOCK.

Witnesses:
E. L. SMITH,
P. P. BALDWIN.